(No Model.) 2 Sheets—Sheet 1.

W. M. RING, J. W. SMITH & A. ANNESS.
LAWN MOWER.

No. 513,442. Patented Jan. 23, 1894.

Witnesses:
P. P. Sheehan
M. S. Belden

Williamson M. Ring
John W. Smith
Albert Anness
Inventors by James W. See
Attorney (No Model.) 2 Sheets—Sheet 2.
W. M. RING, J. W. SMITH & A. ANNESS.
LAWN MOWER.
No. 513,442. Patented Jan. 23, 1894.
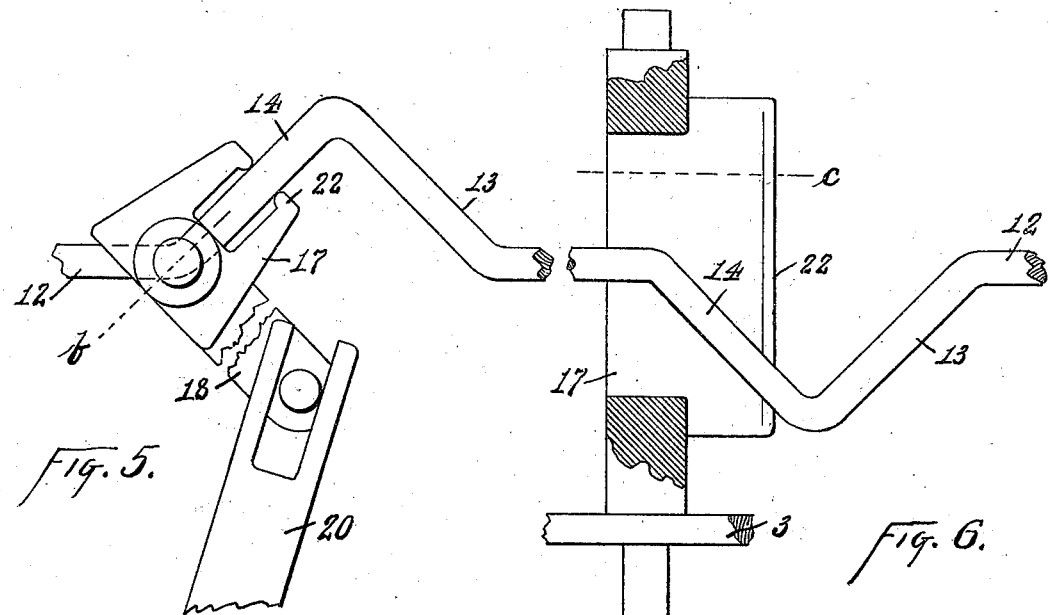
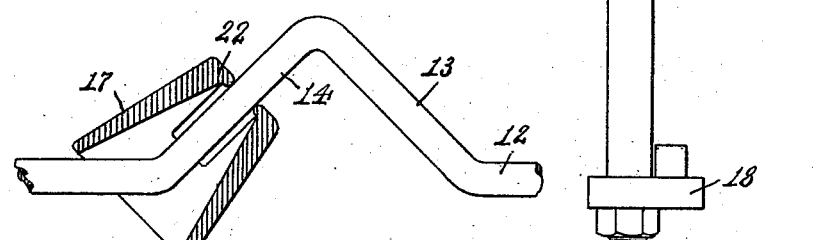
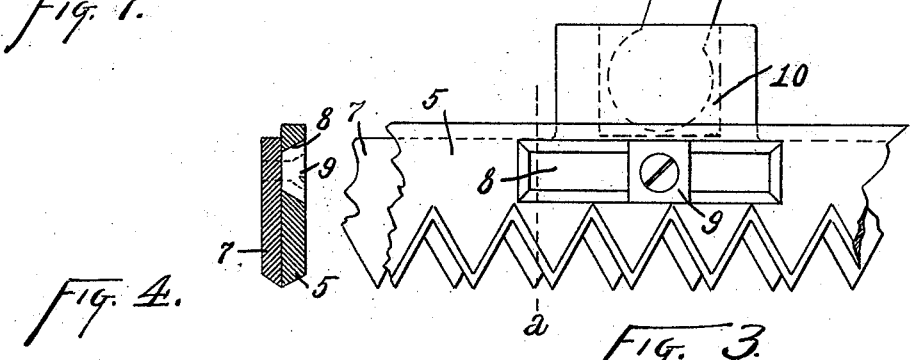
Witnesses:
M. S. Belden
P. P. Sheehan
Inventors
Williamson M. Ring
John W. Smith
Albert Anness
by James W. See Attorney

UNITED STATES PATENT OFFICE.

WILLIAMSON M. RING, JOHN W. SMITH, AND ALBERT ANNESS, OF LIBERTY, INDIANA, ASSIGNORS OF ONE-FOURTH TO ANDREW W. SNYDER, OF SAME PLACE, AND SAID RING ASSIGNOR OF HIS REMAINING INTEREST TO LUTHER B. LEONARD, OF SAME PLACE.

LAWN-MOWER.

SPECIFICATION forming part of Letters Patent No. 513,442, dated January 23, 1894.

Application filed March 28, 1893. Serial No. 468,077. (No model.)

*To all whom it may concern:*

Be it known that we, WILLIAMSON M. RING, JOHN W. SMITH, and ALBERT ANNESS, of Liberty, Union county, Indiana, have invented certain new and useful Improvements in Lawn-Mowers, of which the following is a specification.

This invention relates to mowing machines, designed principally for lawn mowing, and the improvements will be readily understood from the following description taken in connection with the accompanying drawings, in which—

Figure 1:
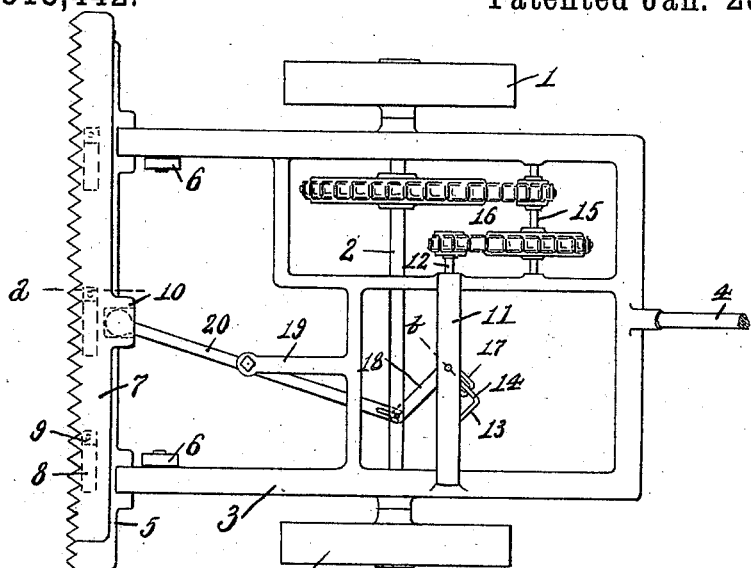
Figure 2:
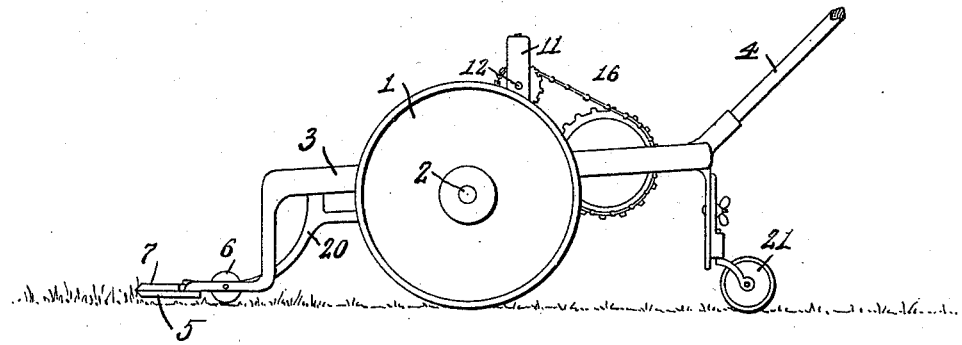

Figure 1, is a plan of the machine; Fig. 2, a side view of the machine; Fig. 3, a bottom view of a portion of the cutting apparatus; Fig. 4, a vertical section of the cutting apparatus in the line of "a;" Fig. 5, a plan of the crank and its accessories for actuating the cutter; Fig. 6, an elevation of the same, part vertical section in the plane of line "b;" and Fig. 7, a plan of the same, part horizontal section, in the plane of line "c."

In the drawings:—1, indicates a pair of ground-wheels: 2, their axle to which the wheels will be united by means of the usual ratchets so that as the machine moves forward the shaft will turn with the wheels or with whichever one of them moves the faster: 3, a frame, mounted on the axle: 4, the handle for pushing the machine: 5, the cutter-bar, being a flat sickle bar fixed across the forward part of the frame, the frame lying between the main wheels and the cutter-bar extending endwise beyond the sides of the frame and endwise beyond the outer lines of the main wheels: 6, rolls upon the frame just to the rear of the cutter-bar and designed to limit the approach of the cutter-bar to the ground: 7, the knife, being a flat sickle lying upon the upper surface of the cutter-bar: 8, longitudinal slots through the cutter-bar, of dove-tail cross-section: 9, dove-tail blocks engaging these slots in the cutter-bar and secured to the lower surface of the knife, the knife being thus at liberty to reciprocate upon the cutter bar without the necessity for projecting guides either above or below the cutting apparatus: 10, a socket formed in the rear edge of the knife: 11, a frame bar disposed above the level of the main frame 3: 12, a crank-shaft journaled in uprights of the main frame below the frame bar 11, this crank-shaft being parallel with axle 2: 13, a bend in the crank-shaft to form the crank: 14, the wrist of the crank, this wrist being not parallel with the crank-shaft but at an angle formed about forty-five degrees to it, the crank being therefore an angular crank: 15, a counter-shaft mounted in the frame parallel with the axle and crank-shaft: 16, sprocket chain gearing connecting the axle and counter-shaft and crank-shaft so that as the axle turns the crank-shaft turns at a multiplied rate: 17, a vertically slotted spindle journaled vertically in the frame, its upper end being pivoted in frame-bar 11, the slot in this spindle inclosing the wrist 14 of the crank, the side walls of the slot projecting outwardly a short distance from the body of the spindle to form lips 22 which engage and fit the wrist 14 of the crank, the remaining portions of the slot being entirely free of the wrist of the crank: 18, an arm fixed upon the lower end of the wrist: 19, a forwardly projecting frame part: 20, a sway-bar pivoted intermediately to the frame part 19 and having its forward end connected by knuckle pivot with the socket 10 of the knife, and having its rear end pivoted, by slot, to the arm 18 of the spindle: 21, a vertically disposed caster wheel at the rear end of the frame: and 22, the spindle lips before referred to as engaging the crankwrist 14.

By examining Figs. 5, 6 and 7, it will be observed that the spindle is virtually provided with two lever arms, namely, arm 18 which oscillates the swaybar and a much shorter arm formed by lips 22. When the bend of the crank hangs down, as in Fig. 6, the short arm of the spindle, formed by lips 22, stands parallel with the axis of the crank-shaft. If the crank be turned quarter way, as in Figs. 5 and 7, the wrist of the crank, engaging lips 22 of the spindle, will have given the spindle a partial rotation, and thus, as the crank rotates, the spindle is rapidly oscillated.

As the machine moves forward on the ground the axle 2 is turned by the traction of the main wheels upon the ground and the knife 7 becomes rapidly reciprocated in an obvious manner and a swath will be cut of greater width than the wheel gage of the machine. In use, the height of stubble is determined by the adjustment of wheel 21, the cutting apparatus rising as much as wheel 21 will permit. Rolls 6 simply prevent the digging of the cutting apparatus into the ground in case the rear portion of the machine becomes elevated. It will be observed that the cutting apparatus is plain and smooth upon both its upper and lower surfaces, being free from projecting guides.

We claim as our invention—

1. The combination, substantially as set forth, with the frame and wheels and axle and mechanism for giving motion to the knife, of a cutter-bar and knife lying against each other and provided with guides formed by dovetail blocks fixed upon one and sliding in dovetail slots in the other.

2. The combination, substantially as set forth, with a frame, wheels, axle, and cutting apparatus, of a crank-shaft provided with an angular crank-wrist, a slotted spindle provided with a lipped arm engaging said crank-wrist, and connections to transmit motion from said spindle to the knife of the cutting apparatus.

WILLIAMSON M. RING.
JOHN W. SMITH.
ALBERT ANNESS.

Witnesses:
ALBURT DAVIS,
DANIEL T. SNYDER.